(12) United States Patent
Allen et al.

(10) Patent No.: US 8,984,194 B2
(45) Date of Patent: Mar. 17, 2015

(54) MULTI-MASTER BUS ARBITRATION AND RESOURCE CONTROL

(75) Inventors: Duane E. Allen, Sheffield, VT (US); James Jay Allen, Sparks, NV (US)

(73) Assignee: Numia Medical Technology LLC, Newport, VT (US)

( * ) Notice: Subject to any disclaimer, the term of this patent is extended or adjusted under 35 U.S.C. 154(b) by 363 days.

(21) Appl. No.: 13/327,058

(22) Filed: Dec. 15, 2011

(65) Prior Publication Data

US 2012/0191891 A1 Jul. 26, 2012

Related U.S. Application Data

(60) Provisional application No. 61/435,010, filed on Jan. 21, 2011.

(51) Int. Cl.
*G06F 13/14* (2006.01)
*G06F 13/20* (2006.01)
*G06F 13/40* (2006.01)

(52) U.S. Cl.
CPC ............. *G06F 13/20* (2013.01); *G06F 13/40* (2013.01); *G06F 13/4068* (2013.01); *G06F 13/14* (2013.01)
USPC ........... 710/107; 710/113; 710/119; 710/240; 710/241; 710/242

(58) Field of Classification Search
CPC ......... G06F 13/14; G06F 13/20; G06F 13/40; G06F 13/4068
USPC ......... 710/108, 200, 240, 107, 113, 119, 241, 710/242
See application file for complete search history.

(56) References Cited

U.S. PATENT DOCUMENTS

| | | | | |
|---|---|---|---|---|
| 3,803,577 A | * | 4/1974 | Peterson, II | 340/568.4 |
| 4,536,839 A | * | 8/1985 | Shah et al. | 711/151 |
| 4,575,714 A | * | 3/1986 | Rummel | 340/468 |
| 4,621,342 A | * | 11/1986 | Capizzi et al. | 710/111 |
| 4,939,511 A | * | 7/1990 | Hinckley | 340/13.38 |
| 5,187,781 A | * | 2/1993 | Heath | 710/262 |
| 5,428,752 A | * | 6/1995 | Goren et al. | 710/300 |
| 5,430,848 A | * | 7/1995 | Waggener | 710/123 |
| 5,544,332 A | * | 8/1996 | Chen | 710/108 |
| 5,729,701 A | * | 3/1998 | Eriksson | 710/110 |
| 5,754,777 A | * | 5/1998 | Lee | 709/204 |
| 5,758,104 A | * | 5/1998 | Gujral et al. | 710/107 |
| 5,761,452 A | * | 6/1998 | Hooks et al. | 710/116 |
| 5,845,097 A | * | 12/1998 | Kang et al. | 710/117 |
| 5,892,973 A | * | 4/1999 | Martinez et al. | 710/15 |
| 5,941,967 A | * | 8/1999 | Zulian | 710/107 |
| 6,112,272 A | * | 8/2000 | Gates | 710/110 |
| 6,167,474 A | * | 12/2000 | Lee | 710/107 |
| 6,192,425 B1 | * | 2/2001 | Sato | 710/48 |
| 6,384,755 B1 | * | 5/2002 | Hayden | 341/120 |
| 6,496,890 B1 | * | 12/2002 | Azevedo et al. | 710/110 |

(Continued)

*Primary Examiner* — Ryan Stiglic
(74) *Attorney, Agent, or Firm* — Downs Rachlin Martin PLLC

(57) ABSTRACT

The present invention discloses an arbitration mechanism for controlling access of a plurality of nodes external to a shared resource, to which accesses by the number of nodes must be restricted, is applicable to any shared source in a computer or computer-controlled system. The present design delivers the following advantageous features. It provides localized arbitration to obtain resource access and localized self-management of resource mastery; eliminates resource seizure locally; it allows equal access to the share resource, encapsulate all four above features with the same circuit/protocol.

31 Claims, 6 Drawing Sheets

(56) References Cited

U.S. PATENT DOCUMENTS

| | | | |
|---|---|---|---|
| 6,526,467 B1 * | 2/2003 | Joh | 710/305 |
| 6,564,278 B1 * | 5/2003 | Olson | 710/301 |
| 6,661,860 B1 * | 12/2003 | Gutnik et al. | 375/354 |
| 6,728,808 B1 * | 4/2004 | Brown | 710/107 |
| 6,766,401 B2 * | 7/2004 | Bonomo et al. | 710/301 |
| 7,096,289 B2 * | 8/2006 | Brown et al. | 710/107 |
| 7,162,557 B2 * | 1/2007 | Takeda et al. | 710/240 |
| 7,668,998 B2 * | 2/2010 | Perisich et al. | 710/262 |
| 7,730,251 B2 * | 6/2010 | Jeanjean | 710/300 |
| 8,190,802 B2 * | 5/2012 | Vallius | 710/113 |
| 2005/0022274 A1 | 1/2005 | Campbell | |
| 2005/0268000 A1 * | 12/2005 | Carlson | 710/15 |
| 2007/0094423 A1 * | 4/2007 | Atkinson | 710/16 |
| 2007/0124002 A1 | 5/2007 | Estes | |
| 2007/0226381 A1 * | 9/2007 | Kuan et al. | 710/16 |
| 2008/0299819 A1 * | 12/2008 | Kakutani | 439/489 |
| 2009/0177827 A1 * | 7/2009 | Perisich et al. | 710/262 |
| 2009/0319709 A1 * | 12/2009 | Vallius | 710/118 |
| 2011/0040247 A1 | 2/2011 | Mandro | |

* cited by examiner

MULTI-MASTER BUS ARBITRATION AND RESOURCE CONTROL

CROSS-REFERENCE TO A RELATED APPLICATION

The present application claims priority to provisional U.S. patent application Ser. No. 61/435,010, filed on Jan. 21, 2011, which is assigned to the assignee of the present application and incorporated herein by reference.

BACKGROUND OF THE INVENTION

This invention is related to a new arbitration mechanism for use in system resource management, such as in modern multiprocessor driven computer or computer-controlled systems where one or more resources must be shared. Allowing unrestricted access to a shared system resource may result in system failure, as the result of data corruption, for example.

A computer network usually comprises multiple computers or processors that communicate, depending on the number of processors in the network, by various mechanisms such as Ethernet or CAN-bus (CSMA/CD), or any asynchronous serial bus employing master/slave arbitration, or a token passing or similar "round robin" protocol. Ethernet is suitable for a large network, but it is inefficient when applied to a small network. In contrast, the flexibility of a serial bus using master/slave arbitration or token passing technology fit the communication needs of a small, lightweight network.

A master/slave system comprises a plurality of processor divided into two groups, one group usually being a single master processor and the other being slave processors. The master processor and slave processors are interconnected by a bus system, typically including a command/data bus and optionally an address/control bus. The slave processors have to constantly wait for permission from the master processor to access their destination; this waiting for the permission slows communication among processors. For the token passing technology, nodes are logically in a ring but are physically connected by a common bus. All tokens are broadcast to every node on the network. Every node on the network has to read the passing tokens to determine if it is a recipient of a message. Only the node having the destination address of a passing token would grab such passing token and act upon the data payload, all other nodes discard the data carried by the token. A node's handling of data from a passing token that is addressed to other nodes wastes time. Additionally, existing arbitration mechanisms for bus mastership are either overly complex or require an active bus concept to be effective.

The present invention proposes a multi-master bus arbitration mechanism that does not need a token passing or similar "round robin" protocol and active bus technology on the network to manage a communication bus to which only limited number of nodes can access. Additionally, the multi-master bus arbitration mechanism can control the number of active nodes, in a multi-node architecture, that can obtain access to the communication bus at any time, and it eliminates all data collisions on the communication bus, while adding minimal complexity to system designs.

SUMMARY

An apparatus for controlling access of a plurality of nodes external to a shared resource, to which accesses by the number of nodes must be restricted, in a computer or computer-control system, the apparatus comprises an aggregation component capable of generating a biased signal from a request signal sent by a node of the plurality of nodes requesting access to the shared resource, a reference signal, and a comparator in which the reference signal is preset comparing the reference signal with the biased signal and generate a logic output signal interpreted either as "access to the share resource granted" or "access to the share resource denied". These and other features, aspects, and advantages of the present invention will become better understood with reference to the following description, appended claims, and accompanying drawings.

DETAILED DESCRIPTION OF EXEMPLARY EMBODIMENTS

Figure 1:
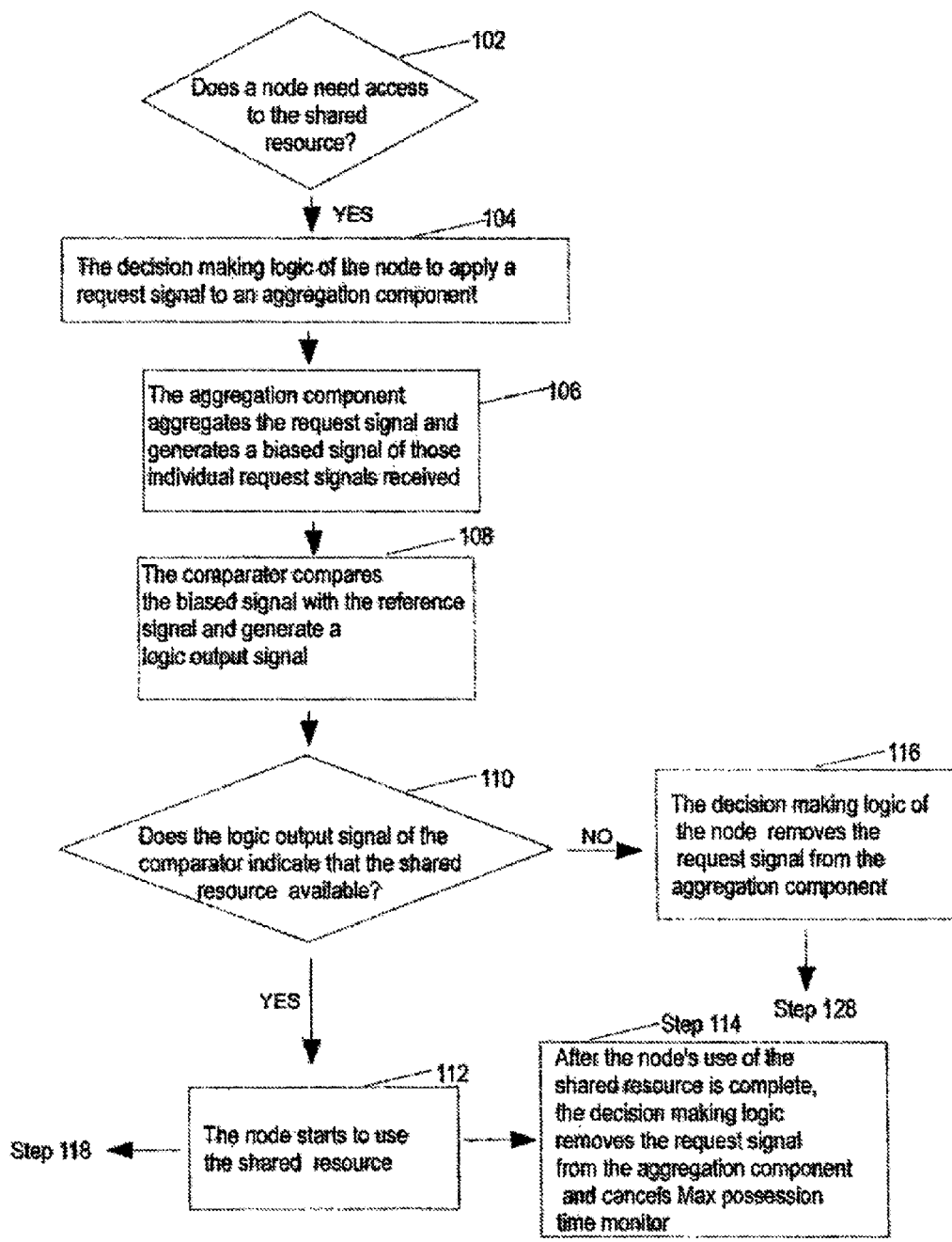
FIG. 1. A flowchart showing the arbitration process that a node accesses to a shared resource.

The mechanism to be described in the present invention for controlling access of a plurality of nodes external to a shared resource, to which accesses by the number of nodes must be restricted, is applicable to any shared source in a computer or computer-control system. The present design delivers the following advantageous features. It provides localized arbitration to obtain resource access and localized self-management of resource mastery; eliminates resource seizure locally; it allows equal access; encapsulate all four above features with the same circuit/protocol. However, the present invention does not require that all the advantageous features need be incorporated into every embodiment.

In an embodiment, an apparatus for controlling access of the plurality of the nodes to the shared resource comprises a comparator, a reference signal preset in the comparator, and an aggregation component. Each of the plurality of nodes that need access to the shared source is capable of adding a request signal, to access to the shared resource, to the aggregation component. The aggregation component adds up the request signals received from those nodes of the plurality of nodes that request access to the shared resource and generates a biased signal. The comparator compares the reference signal and the biased signal and generates a logic output signal.

In an embodiment, the comparator comprises a digital signal comparator and an analog to digital converter. The analog to digital converter converts the biased signal from the aggregation component to a digital value and the digital comparator compares the digital value with the digital reference value. In another embodiment, an analog signal comparator is used as the comparator. The analog comparator compares the biased signal with the analog reference value.

The apparatus for controlling access of the plurality of the nodes to the shared resource further comprises a decision making logic. A node of the plurality of nodes applies/removes the request signal for access to the shared resource to/from the aggregation component by the decision making logic. After waiting an appropriate length of time for the logic output signal propagation, the decision making logic associated with those nodes of the plurality of nodes that have requested access to the shared resource interprets the logic output signal as either an "access to the shared resource granted" or "access to the shared resource denied" signal. When the biased signal is such that the number of external nodes requesting access to the shared resource exceeds a designed limit, the comparator generates an output signal that the decision making logic received can be interpreted as "access to resource denied" output signal. Otherwise, the comparator generates an output signal that the decision making logic can interpret as "access to resource granted." Specifically, if the access to the shared resource requested by a node of the plurality of nodes is granted, the node will use the shared resource as desired. If the access to the shared resource by a node of the plurality of nodes is denied, the decision making logic associated with the node would remove its access request signal from the aggregation component, wait a random length of time, then reattempt to obtain access to the shared resource. When the node does not need to access to the shared resource anymore, the node relinquishes its hold of the shared resource by removing its access request signal from the aggregation component through the decision making logic.

The plurality of nodes are physical electronic devices such as memory devices, graphic display units, etc., which are tinder control of microcontrollers or microprocessors, or microcontrollers.

The total number of nodes connected to the shared resource in a computer system is only limited by the resistive, inductive, and capacitive constraints of the electrical circuit and its affiliated components. In one embodiment, the apparatus for controlling access of the plurality of the nodes to the shared resource is designed such that only one node can access to the restrict resource at a time, which is a mutex configuration. In another embodiment, the apparatus for controlling access of the plurality of the nodes to the shared resource is designed such that several nodes can access to the restricted resource simultaneously, which is a semaphore configuration.

Figure 2:
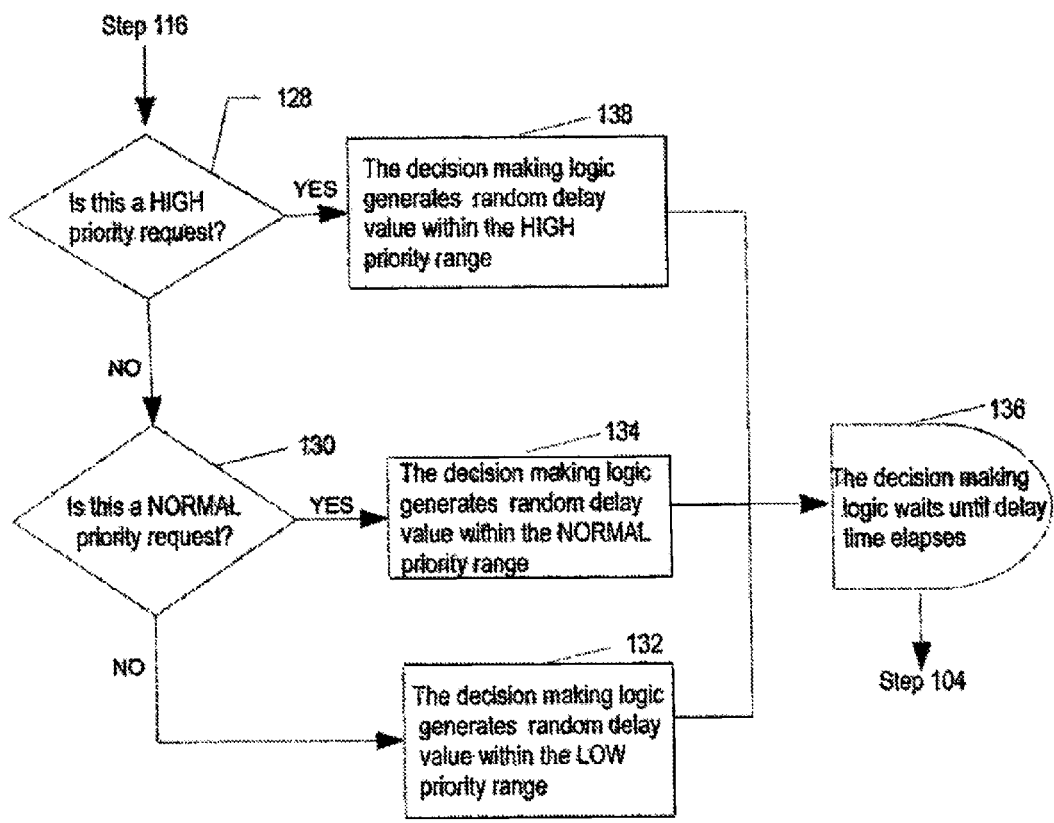
FIG. 2. A flowchart showing a backoff algorithm mechanism.
Figure 3:
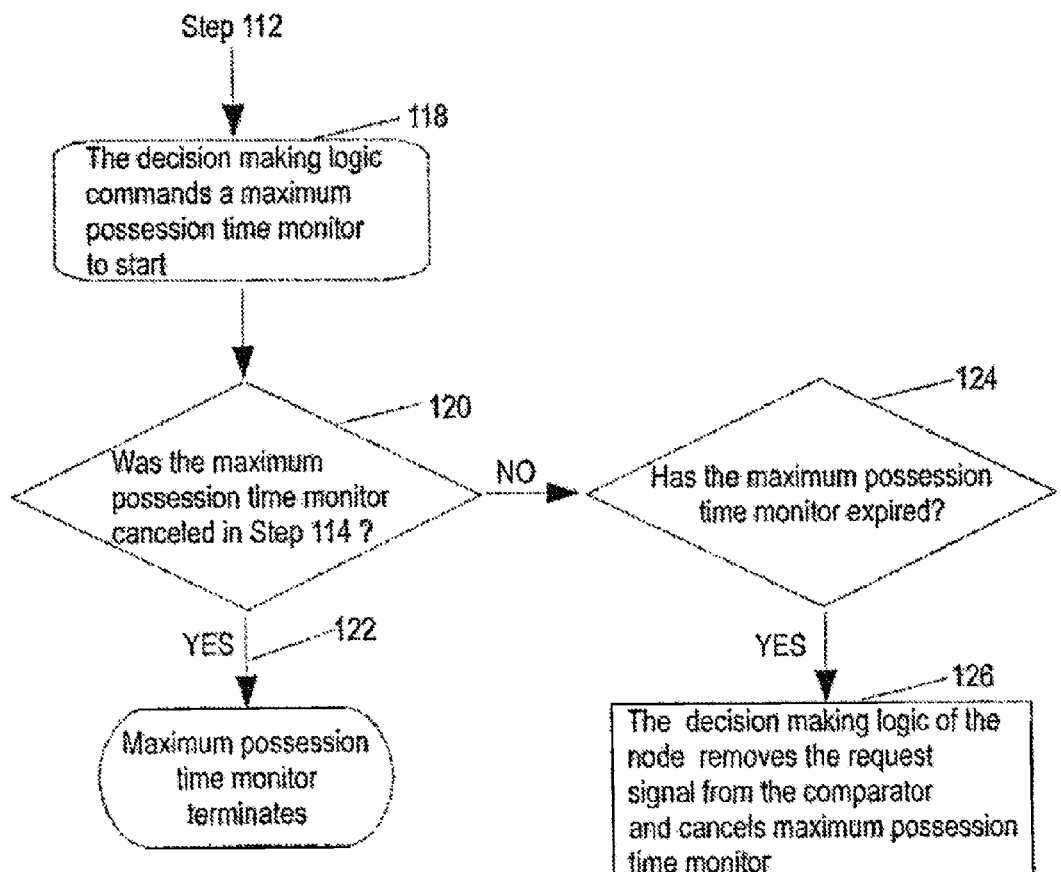
FIG. 3. A flowchart showing a safety mechanism.

The above design is demonstrated in the FIGS. 1, 2, and 3. An inquiry is made in Step 102 as to whether a node needs access to the shared resource. If "yes", the decision making logic associated with the node applies the request signal to the aggregation component in Step 104. In Step 106, the aggregation component aggregates the request signals that have been received and generates the biased signal from those request signals. Afterward, the comparator compares the biased signal with the preset reference signal and generates the logic output signal in Step 108. The decision making logic waits until the comparator propagation delay times elapses; then an inquiry is made in Step 110 as to whether the logic output signal indicates that the shared resource is available. If the answer is "yes" to the inquiry in Step 110, the node starts to use the shared resource in Step 112. After the node's use of the shared resource is completed the decision making logic of the node removes the request signal from the aggregation component in Step 114 and cancels a maximum possession time monitor.

Referring to FIGS. 1 and 2, if the answer is no to the inquiry in Step 110, in Step 116 the decision making logic removes the request signal from the aggregation component and to proceed to a backoff algorithm mechanism of Step 128. The backoff logarithm assigns a random wait time to a node of the plurality of nodes requesting access to the shared resource. In Step 128, an inquiry as to whether the request is a high priority is made. If "yes", then the decision making logic goes to Step 138 to generate a random delay value within the high priority range. If "no", the decision making logic goes to Step 130 asking whether the request is a normal priority request. If "yes" to the inquiry in Step 130, the decision making logic generates a random delay value within a normal priority range in Step 134; otherwise, the decision making logic moves to Step 132 to generate random delay value within a low priority range. In Step 136, the decision making logic waits until delay time elapses, then go to Step 1104 to reattempt to access the shared resource.

In an embodiment, a safety mechanism that ensures that failure of a node does not cripple the entire system is set up. Once the node starts to use the shared resource, the decision making logic commands a maximum possession time monitor to forbid over-long occupation. If the node suffers catastrophic failure, its request signal will be forcibly removed from the aggregation component. The mechanism is demonstrated in the FIG. 3.

Referring to FIG. 3, when a node starts to use the shared resource, the decision making logic commands a maximum possession time monitor start to count time in Step 118. A determination is made as to whether the maximum possession time monitor is cancelled by Step 114 in Step 120. If "yes", the maximum possession time monitor terminates in Step 122. If "no", another determination is made as to whether the maximum possession time monitor expires in Step 124. If "yes" to the inquiry in Step 124, the decision making logic of the node removes the request signal from the comparator and cancels the maximum possession time monitor in Step 126.

In an embodiment, the reference signal and the request signal are voltage and an voltage comparator is applied.

Figure 4:
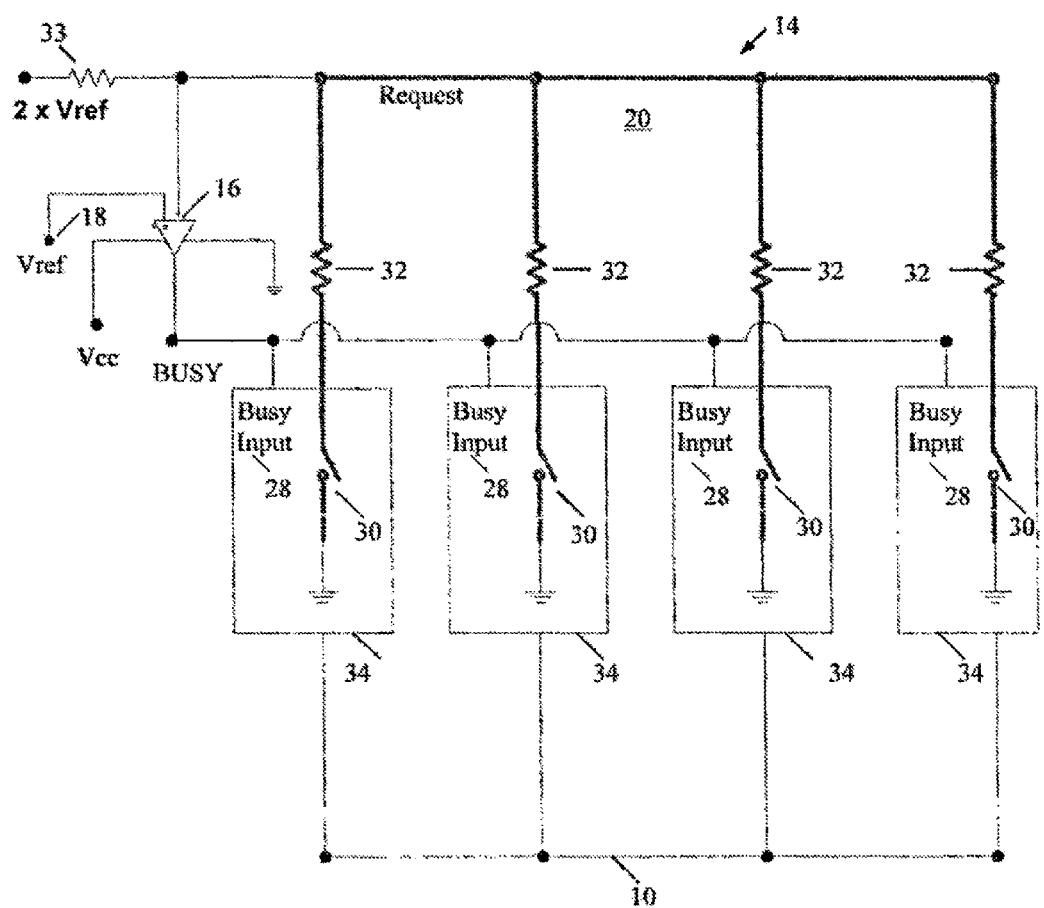
FIG. 4. A circuit for a two-wire implementation of the arbitration mechanism of the present invention.

FIG. 4 shows an embodiment of a two-wire system when a voltage comparator is employed; two separate lines built in the computer system conduct each function of "shared resource busy" and "request signal to send/access" by means of an electronic circuit breaker scheme. The apparatus 14 for controlling access of the plurality of the nodes 34 to the shared resource 10 comprises an voltage comparator 16 built in the computer system, a preset voltage, Vref 18 stored in the voltage comparator 16, and at least one resistor 33 having a known value arranged in series with an aggregation component 20, connected with the voltage comparator 16. The aggregation component 20 comprises a plurality of parallel resistors 32 built within the computer system and the plurality of resistor controls 30, correspondingly associated with each of the plurality of parallel resistors 32, built within each of the plurality of the nodes with which its correspondent resistor 32 communicates. The aggregation component 20 is shown in a thicker gray line. The resistor 33 is a permanently connected to the apparatus 14. Each of the plurality of parallel resistors 32 communicating with an individual node of the plurality of node is connected to the aggregation component 20 only when such a node need access to the shared resource 10.

The apparatus 14 for controlling access of the plurality of the nodes to the shared resource 10 further comprises a decision making logic 28 built within each of the plurality of nodes, with which the decision making logic 28 communicates. When a node of the plurality of nodes 34 need access to the shared resource 10, its decision making logic 28 sends the request signal to the aggregation component 20. In this case, the request signal is realized by closing the resistor control 30 and thereby connecting the resistor 32 to the aggregation component 20. The aggregation component 20 adds up resistance of the resistors 32 connected to the aggregation component 20 and generates the biased signal, a voltage dropped across the aggregation component 20, which will be sent to the voltage comparator 16. The voltage comparator 16 compares the preset reference voltage, Vref 18 with the biased signal, and generates the logic output signal and sends it to the decision making logic 28. If the logic output signal is interpreted by the decision making logic 28 as "access to the shared resource granted", the node starts to use the shared resource 10 as desired. Otherwise, it has to wait as indicated by the FIG.

Figure 5:
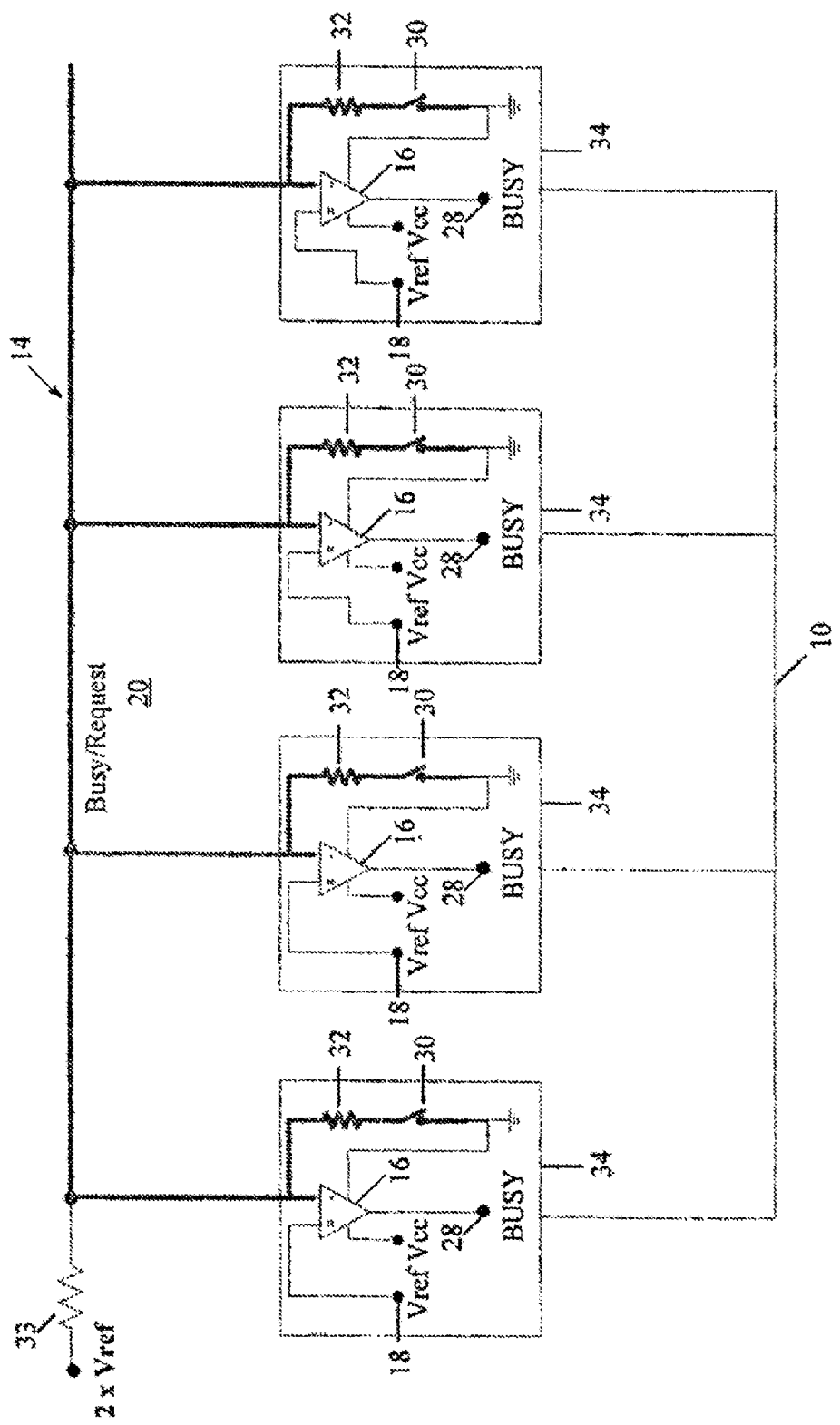
FIG. 5. A circuit for a single-wire implementation of the arbitration mechanism of the present invention.

In another embodiment, referring to FIG. 5, a single-wire system is used, a single wire being built in the computer system implements both the functions of "shared resource busy" and "request to send/access" by means of an electronic circuit breaker scheme. The apparatus 14 for controlling access of the plurality of nodes 34 to the shared resource 10 has a voltage comparator 16 built in each node of the plurality of nodes instead of in the computer system, a preset reference voltage, Vref 18, and at least one resistor having a known value in series with an aggregation component 20. The aggregation component 20 comprises a plurality of parallel resistors 32 and a plurality of resistor controls 30 separately associated with each of the plurality of parallel resistors 32. Each of the plurality of parallel resistors 32 and its correspondent resistor control 30 are built within each of the plurality of nodes with which the resistor 32 communicates. The aggregation component 20 is shown in a thicker gray line. The resistor 33 is a permanently connected to the apparatus 14. Each of the plurality of parallel resistors 32 communicating with an individual node of the plurality of node is connected to the aggregation component 20 only when such a node need access to the shared resource 10.

The apparatus 14 for controlling access of the plurality of the nodes to the shared resource further comprises a decision making logic 28 implemented by a controlling mechanism—software and/or hardware. The decision making logic 28 is built within each node of the plurality of nodes 34 with which it communicates. When a node of the plurality of nodes 34 need access to the shared resource 10, its decision making logic 28 sends the request signal to the aggregation component 20 by closing the correspondent resistor control 30 and thereby connecting a resister 32 to the aggregation component 20. The aggregation component 20 adds up the resistance of the parallel resistors 32 connected to aggregation component 20, and generates a biased signal, the voltage dropped across the aggregation component 20, which will be sent to the voltage comparator 16. The voltage comparator 16 compares a reference voltage, Vref 18 with the biased signal and sends a logic output signal to the decision making logic 28. If the logic output signal is interpreted by the decision making logic 28 as "access to the shared resource granted", the node starts to use the shared resource 10 as desired. Otherwise, it has to wait as indicated by the FIG. 2.

In an embodiment, to complete the task stated in the previous paragraph, the decision making logic 28 is implemented using software that is incorporated into the node's main application software. The node's main application software executes a main task of the node with which the decision logic 28 is associated. Also, in an embodiment, the decision making logic 28 is implemented in hardware by coding the algorithm in the silicon of a microprocessor or microcontroller, using silicon die area dedicated to this purpose. This is accomplished by using discrete components such as logic gates, comparators, timers, counters, data storage registers, RAM, ROM and other simple electronic building blocks commonly used to implement "on chip" peripherals. In yet another external hardware implementation of the decision making logic 28, simple, low cost microcontrollers dedicated entirely to the decision process may be employed; the microcontroller would have the software implementation as their main application code. These aforesaid embodiments for the decision making logic 28 are applicable both for the two-wire system and single-wire system.

In an embodiment for the single wire system, the voltage comparator 16 is built into the silicon die area, where the algorithm used for decision making logic 28 is coded. In another embodiment, the comparator is external to the decision making logic 28.

In an embodiment, the resistor controls 30 is a circuit breaker or switch in conjunction with software for controlling the plurality of parallel resistors to connect or disconnect to the aggregation component 20. This embodiment is suitable for both the single-wire and two-wire system. In another embodiment the switch is an electronic device such as a transistor.

In an embodiment, the voltage comparator 16 is a dedicated voltage comparator. In another embodiment, an operational amplifier configured to function as the voltage comparator 16 is implemented. To be compatible with the plurality of nodes, if the plurality of nodes are microprocessors, a dedicated voltage comparator and a transistor-transistor logic (TTL) would be implemented, and in the other situations, an operational amplifier configured to function as the voltage comparator and programmable logic controller (PLC) input voltage is utilized. Both TTL level and PLC level are either logic high or logic low. The TTL or PLC circuit is designed such that when the biased signal is equal to or less than the reference voltage, the TTL or PLC level would swing from logic low to logic high indicating the shared resource 10 unavailable, in other words, indicating access to the shared resource 10 denial. In contrast, if the biased signal is larger than the Vref 18, both of them would stay logic low indicating the shared resource 10 available, in other word, access to the shared resource granted. The TTL or PLC circuit may also be designed to invert logic levels.

In an embodiment, the TTL level is less than or equal to 5V.

Referring to the FIG. 5, the voltage of Vref. 18 and resistance of resistors 33 and 32 are arbitrarily set to be compatible with intended application, choices of devices, preference of the engineers implementing the design. Here is an example for illustration, assuming the resistance of resistors 32 of the aggregation component 20 has the same values equal to 110Ω and the resistance of resistors 33 is equal to 100 KΩ. Further, assuming the voltage of the aggregation component 20 is 10V, then its preliminary voltage is 10V when none of the plurality of parallel resistors 32 is connected to the aggregation component 20. When one node is connected to the aggregation component 20, the biased signal or the voltage dropped across the aggregation component 20 would be equal to 5.24; when two nodes are connected to the aggregation component 20, the biased signal would be 3.55V; when three nodes, then 2.68V. Assuming Vref 18 is 5V, a half of the preliminary voltage of the aggregation component 20, the TTL level is designed to stay logic low, when the biased signal is larger than the Vref 18, 5V indicating the shared resource 10 available. Thus, when one node requests to access to the shared resource 10, the biased signal is 5.24V, larger than the Vref 18, 5V, the TTL level staying in logic low and indicating the shared resource 10 available; the node would use the shared resource as desired. When two nodes request to access to the shared resource 10 at the same time, the biased signal would be 3.55V, less than the Vref 18, 5V, the TTL level switching to logic high and indicating that the shared resource 10 is unavailable; the node's request to access would be denied. The aforementioned is a representation of a mutex configuration. In contrast, if the Vref 18 is design as 3V. When two nodes request to access to the shared resource 10 at the same time, the biased signal would be 3.55V, the TTL level would still stays in logic low indicating that the shared resource 10 is available. This is a representation of a semaphore configuration.

Figure 6:
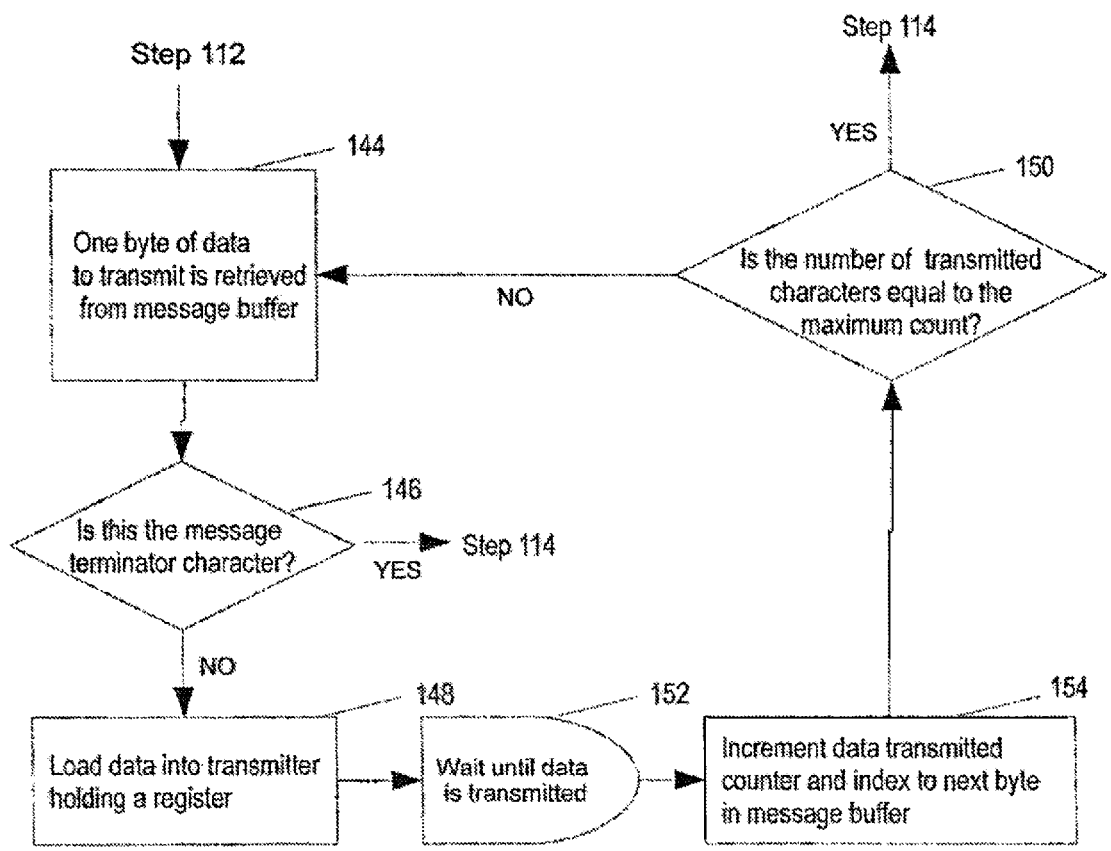
FIG. 6. A shared resource is a communication bus.

In an embodiment, the shared resource 10 is a communication bus demonstrated in FIG. 6. The present invention also can apply to other shared resources. In Step 144, one byte of data to transmit is retrieved from a message buffer, in Step 146, an inquiry is made as to whether this message terminator character. If "yes", go to Step 114; if "no", go to Step 148 loading data into transmitter holding a register. In Step 152, wait until data is transmitted. In Step 154, increment data transmitted counter and index to next byte in message buffer. In Step 150, an inquiry is made as to whether the number of transmitted character equal to the maximum count. If "yes," go to Step 114; if "no," go to Step 144.

The above examples are illustrative only. Variations obvious to those skilled in the art are a part of the invention.

What is claimed is:

1. An apparatus for controlling access of a plurality of nodes external to a shared resource, to which accesses by the plurality of nodes must be restricted, in a computer or computer-controlled system, the apparatus comprising:
   an aggregation component for generating a bias from a request of a node of the plurality of nodes requesting access to the shared resource; and
   plural comparators, one disposed in each said node, for comparing a reference with said bias and generating an output as a function of said comparing.

2. An apparatus according to claim 1, wherein at least one said comparator comprises a voltage comparator.

3. An apparatus according to claim 2, further comprising at least one resistor in series with said aggregation component, wherein said aggregation component comprises a plurality of parallel resistors.

4. An apparatus according to claim 3, wherein said aggregation component further comprises a plurality of resistor controls for controlling connection of each of said plurality of parallel resistors to said aggregation component.

5. An apparatus according to claim 2, wherein said voltage comparator comprises a dedicated voltage comparator.

6. An apparatus according to claim 2, wherein said voltage comparator comprises an operational amplifier configured to function as a voltage comparator.

7. An apparatus according to claim 1, wherein said comparators each comprises at least one of a digital comparator and an analog comparator.

8. An apparatus according to claim 7, wherein said digital comparator further comprises an analog to digital converter for converting said bias to a digital value.

9. An apparatus according to claim 2, wherein said voltage comparator utilizes a transistor-transistor logic voltage level for nodes corresponding to microprocessors.

10. An apparatus according to claim 2, further comprising logic for generating said request of a node, associating said request with said aggregation component, receiving said output from the comparator of the node associated with said request, and interpreting said output to determine whether to grant the node associated with said request access to the shared resource.

11. An apparatus according to claim 10, further comprising a single-wire system.

12. An apparatus according to claim 11, wherein at least one said node corresponds to a microcontroller.

13. An apparatus according to claim 12, wherein each node comprises logic for communicating with one or more other nodes of the plurality of nodes.

14. An apparatus according to claim 10, wherein said logic comprises at least one of software and hardware.

15. An apparatus according to claim 10, further comprising a mechanism for limiting access to the shared resource by at least one said node to a maximum possession time.

16. An apparatus according to claim 15, wherein said mechanism comprises a time monitor for tracking an amount of time that at least one said node is granted access to the shared resource.

17. An apparatus according to claim 16, wherein when said time monitor reaches said maximum possession time while tracking an amount of time that at least one said node accesses the shared resource or a node previously granted access to the shared resource no longer requires access to the shared resource, said time monitor stops counting time and said logic disassociates said request from said aggregation component.

18. An apparatus according to claim 1, further comprising a backoff algorithm for assigning a random wait time to at least one said node when the shared resource is unavailable.

19. An apparatus according to claim 1, wherein the shared resource comprises a communication bus.

20. An apparatus according to claim 1, wherein said reference is a digital value.

21. An apparatus according to claim 1, wherein said reference is an analog signal.

22. An apparatus according to claim 21, wherein said reference is a voltage.

23. A method for controlling access to a shared resource in a system with a plurality of nodes external to the shared resource, the method comprising:
   generating a bias from a request of at least one of the plurality of nodes requesting access to the shared resource, the bias based on parallel resistors each of the same resistance with one said resistor associated with each said node;
   comparing a reference with the bias; and
   determining availability of the shared resource based on a difference between the bias and the reference.

24. A method according to claim 23, further comprising providing logic for generating the request of a node and an aggregation component for generating the bias, associating the request with the aggregation component, receiving the output from the comparator, and interpreting the output to determine whether to grant the node associated with the request access to the shared resource.

25. An apparatus for controlling access by a plurality of nodes external to a shared resource, comprising:
   an aggregation component comprising plural parallel resistance values, each resistance value associated with one said node and a resistance control associated with each said resistance value, the aggregation component configured to generate a bias based on resistance values of nodes requesting access to the shared resource;
   a separate resistance value disposed in series with said aggregation component; and
   a comparator configured to receive a reference voltage, to determine a difference between the reference voltage and the bias, and to generate an output signal based on said difference correlated to availability of the shared resource.

26. An apparatus according to claim 25, wherein said comparator comprises a voltage comparator.

27. An apparatus according to claim 26, wherein said voltage comparator comprises plural discrete voltage comparators, one each associated with one node of said plurality of nodes.

28. An apparatus according to claim 26, wherein said voltage comparator is a dedicated voltage comparator.

29. An apparatus according to claim 25, wherein said plural parallel resistance values are the same value.

30. An apparatus according to claim 29, wherein the separate resistance value disposed in series is different from the parallel resistance values.

31. An apparatus according to claim 25, wherein each said node includes an associated logic device configured to close the associated resistor control in response to a request for access to the shared resource and to interpret the output of the comparator to grant access to the shared resource based on said output.

\* \* \* \* \*